(12) United States Patent
Pfau et al.

(10) Patent No.: US 11,434,007 B2
(45) Date of Patent: Sep. 6, 2022

(54) POWERED RAIL MOUNTED CARGO TUG AND CARGO PLATFORM

(71) Applicant: GOODRICH CORPORATION, Charlotte, NC (US)

(72) Inventors: Ryan Pfau, Jamestown, ND (US); Wallace Harold Larson, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 157 days.

(21) Appl. No.: 16/577,692

(22) Filed: Sep. 20, 2019

(65) Prior Publication Data

US 2021/0086898 A1   Mar. 25, 2021

(51) Int. Cl.
  *B64D 9/00*   (2006.01)
  *B65G 69/24*   (2006.01)

(52) U.S. Cl.
  CPC .............. *B64D 9/00* (2013.01); *B65G 69/24* (2013.01); *B64D 2009/006* (2013.01)

(58) Field of Classification Search
  CPC ..... B64D 9/00; B64D 2009/006; B65G 69/24
  See application file for complete search history.

(56) References Cited

U.S. PATENT DOCUMENTS

| | | | | |
|---|---|---|---|---|
| 565,045 | A | * | 8/1896 | Stillman ................... E01B 5/04 238/130 |
| 3,803,466 | A | * | 4/1974 | Starkey ................. B60L 15/005 104/292 |
| 4,805,852 | A | * | 2/1989 | Nordstrom ............... B64D 9/00 244/118.1 |
| 7,344,109 | B1 | * | 3/2008 | Rezai ...................... B64F 1/322 244/118.2 |
| 7,785,056 | B2 | | 8/2010 | Sanford et al. |
| 9,340,286 | B2 | | 5/2016 | Panzram et al. |
| 9,764,840 | B2 | | 9/2017 | Himmelmann |
| 10,059,450 | B2 | | 8/2018 | Levron |
| 10,196,146 | B2 | | 2/2019 | Himmelmann |
| 2007/0289477 | A1 | * | 12/2007 | Sobolewski .......... E01B 25/305 105/215.2 |
| 2011/0052350 | A1 | * | 3/2011 | Lydle ........................ B63C 3/12 414/277 |
| 2015/0376842 | A1 | * | 12/2015 | Ellis ........................ E01B 19/00 238/130 |
| 2016/0244186 | A1 | * | 8/2016 | Brown ...................... B64C 1/20 |
| 2019/0330033 | A1 | * | 10/2019 | Brutoco ................... B64D 9/00 |
| 2020/0207557 | A1 | * | 7/2020 | Lydle ....................... B66F 9/06 |

\* cited by examiner

*Primary Examiner* — Saul Rodriguez
*Assistant Examiner* — Ashley K Romano
(74) *Attorney, Agent, or Firm* — Snell & Wilmer L.L.P.

(57) ABSTRACT

A cargo handling system is disclosed. In various embodiments, the cargo handling system includes a first rail defining an upward facing surface and a downward facing surface and a longitudinal direction and a lateral direction; a platform configured for rolling engagement with the first rail; and a first tug configured to propel the platform along the first rail in the longitudinal direction, the first tug comprising a power drive unit having a first drive wheel and a guide unit having a first guide wheel.

15 Claims, 6 Drawing Sheets

POWERED RAIL MOUNTED CARGO TUG AND CARGO PLATFORM

FIELD

The present disclosure relates generally to cargo handling systems and, more particularly, to systems used to load and transport cargo in cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Stationary, motor driven rollers are typically employed in these systems. In certain aircraft, a plurality of motor driven power drive units (PDUs), each of which is also stationary, is used to propel the containers or pallets within the cargo compartment. This configuration facilitates transportation of the containers or pallets within the cargo compartment by one or more operators or agent-based systems controlling operation of the PDUs. However, such configurations typically include a complex structure of permanently installed hardware requiring power and control cables running throughout the cargo compartment and to each of the PDUs and other components of the configurations. The configurations also typically are not amendable to loading long cargo runs (e.g., a beam or tower extending a substantial length of the cargo compartment) having multiple support bases where all the support bases are associated with near simultaneous loading in order to limit the placement of undesired stresses on the cargo or the cargo handling system.

SUMMARY

A cargo handling system is disclosed. In various embodiments, the cargo handling system includes a first rail defining an upward facing surface and a downward facing surface and a longitudinal direction and a lateral direction; a platform configured for rolling engagement with the first rail; and a first tug configured to propel the platform along the first rail in the longitudinal direction, the first tug comprising a power drive unit having a first drive wheel and a guide unit having a first guide wheel.

In various embodiments, the first drive wheel is configured to ride above the upward facing surface of the first rail. In various embodiments, the first guide wheel is configured to ride below the downward facing surface of the first rail. In various embodiments, the power drive unit includes a second drive wheel spaced a longitudinal distance from the first drive wheel. In various embodiments, the power drive unit includes a second drive wheel spaced a lateral distance from the first drive wheel. In various embodiments, the guide unit includes a second guide wheel spaced a longitudinal distance from the first guide wheel. In various embodiments, the guide unit includes a second guide wheel spaced a lateral distance from the first guide wheel.

In various embodiments, the power drive unit includes a motor configured to rotate the first drive wheel. In various embodiments, the motor is configured to receive power from a storage device positioned on or within the platform. In various embodiments, the motor is configured to receive power from the first rail.

In various embodiments, a second rail is spaced a lateral distance from the first rail and the platform is configured for rolling engagement with the second rail. In various embodiments, a second tug is configured to propel the platform along the second rail in the longitudinal direction.

A method for loading cargo using a cargo handling system is disclosed. In various embodiments, the method includes positioning a cargo load on a platform disposed in rolling engagement with a first rail and a second rail; and activating a first tug engaged with the platform and with the first rail to propel the platform along the first rail and the second rail in a longitudinal direction, the first tug comprising a power drive unit having a drive wheel and a guide unit having a guide wheel.

In various embodiments, the method further includes activating a second tug engaged with the platform and the second rail to propel the platform along the first rail and the second rail in the longitudinal direction. In various embodiments, the first rail defines a T-shaped cross-sectional geometry and wherein the drive wheel is configured to rest upon and frictionally engage an upward facing surface of the first rail. In various embodiments, the guide wheel is configured to freewheel against a downward facing surface of the first rail.

A system for loading or unloading cargo on a cargo deck is disclosed. In various embodiments, the system includes a first rail and a second rail, each defining an upward facing surface and a downward facing surface and a longitudinal direction and a lateral direction; a platform configured for rolling engagement with the first rail and the second rail; a first tug engaged with the platform and with the first rail and configured to propel the platform in the longitudinal direction, the first tug comprising a power drive unit having a first drive wheel and a guide unit having a first guide wheel; and a second tug engaged with the platform and with the second rail and configured to propel the platform in the longitudinal direction.

In various embodiments, the first drive wheel is configured to ride above the upward facing surface of the first rail and the first guide wheel is configured to ride below the downward facing surface of the first rail. In various embodiments, the power drive unit includes a second drive wheel spaced from the first drive wheel in the lateral direction and the guide unit includes a second guide wheel spaced from the first guide wheel in the lateral direction. In various embodiments, the power drive unit includes a motor configured to rotate the first drive wheel and to receive power from a storage device positioned on or within the platform or from the first rail.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 1A and 1B illustrate schematic views of a cargo handling system, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
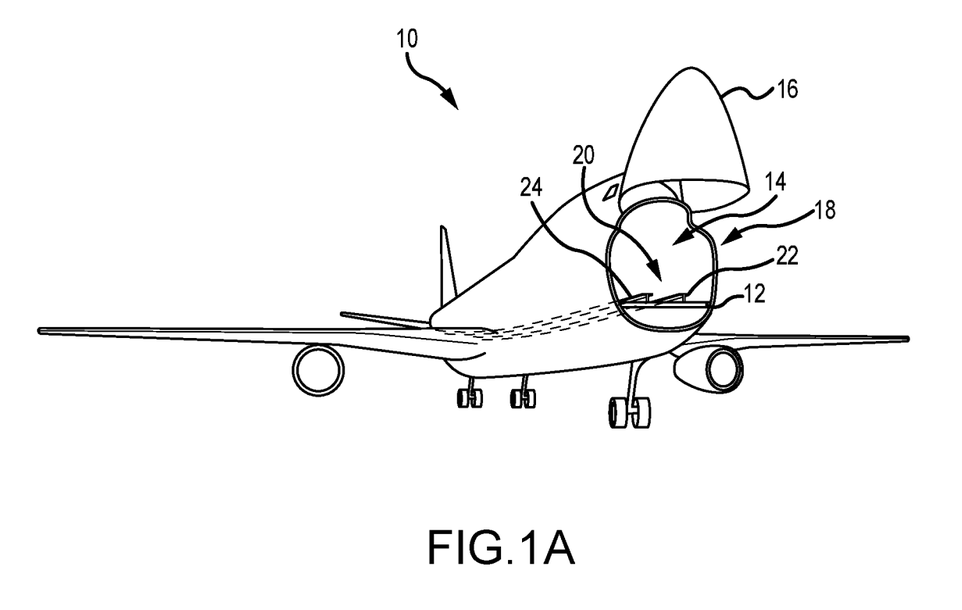
Figure 1B:
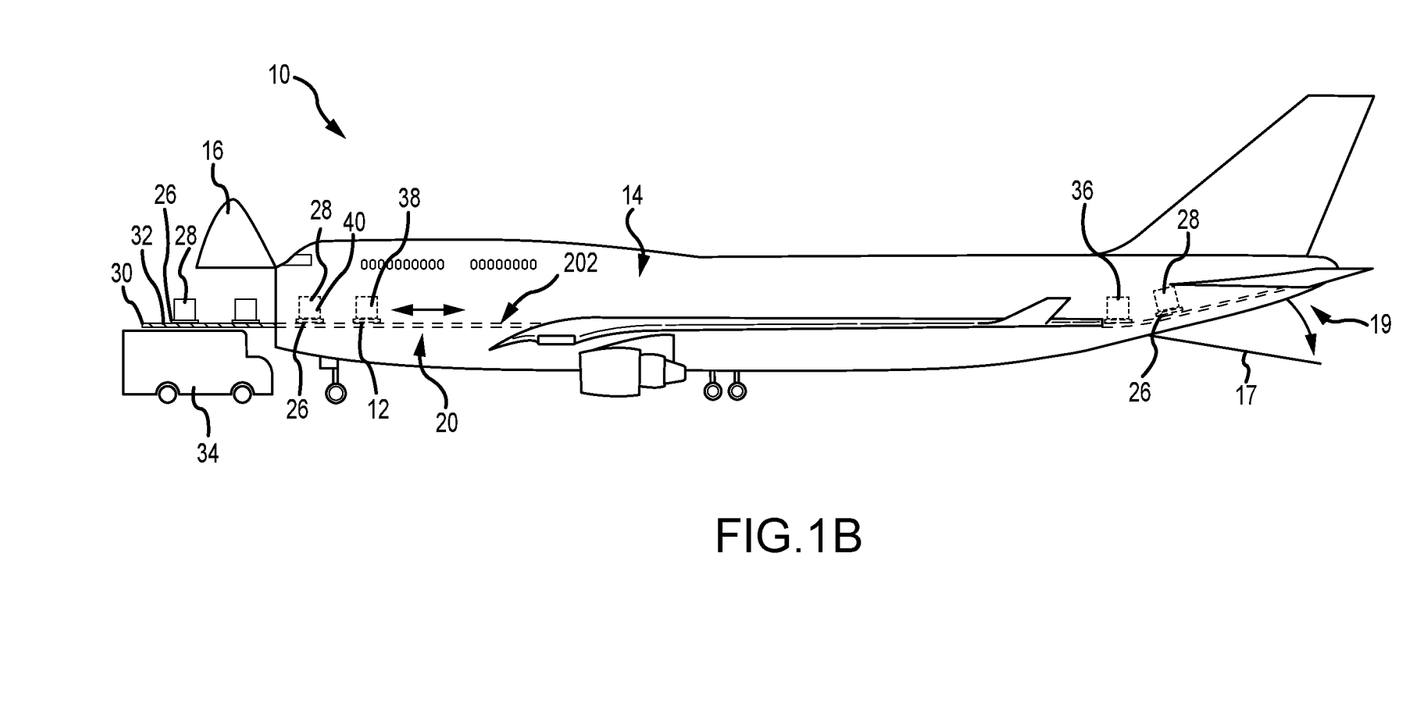

With reference to FIGS. 1A and 1B, a schematic view of an aircraft 10 having a cargo deck 12 located within a cargo compartment 14 is illustrated, in accordance with various embodiments. The aircraft 10 may comprise a cargo load door 16 located, for example, at a forward end of the aircraft 10 and configured to rotate upward (as illustrated in FIG. 1A) or sideways to expose an opening 18 that provides access to the cargo compartment 14. In various embodiments, a second cargo load door 17 may be located at other portions of the aircraft 10, such as, for example, at an aft end of the aircraft 10 and configured to rotate downward (as illustrated in FIG. 1B) and provide a second opening 19 to gain access to the cargo compartment 14. Inside the cargo compartment 14, one or more rails 20, e.g., a first rail 22 and a second rail 24, extend generally from the fore end of the aircraft 10 to the aft end of the aircraft 10. As described more fully below, the one or more rails 20 provide a support structure for which a platform 26 may transit along a length of the aircraft 10 between the fore end and the aft end and carry a ULD or some other form of cargo carrier, such as, for example, a container of a size typically used for ocean-going transport by ship or truck. Without loss of generality, a cargo load 28 of any size or shape, which may include objects within containers or ULDs or objects not within containers or ULDs, such as, for example, automobiles or the like, will be considered herein as configured for transport on the platform 26.

Still referring to FIGS. 1A and 1B, in various embodiments, the one or more rails 20, during loading or unloading of the cargo load 28, may be connected to a loading structure 30 which, in various embodiments, may comprise one or more rails 32 that correspond to the one or more rails 20 extending along the cargo deck 12 of the aircraft 10. In various embodiments, the loading structure 30 may be attached to an elevated structure, such as, for example, a truck 34 (as illustrated in FIG. 1B) or a scissor lift or a loading dock or the like, such that the one or more rails 20 and the loading structure 30 are located substantially at the same elevation and configured to transition a platform 26 either onto or off from the one or more rails 20. For example, a first cargo load 36 may be transitioned from the loading structure 30, through the opening 18 and onto the one or more rails 20, and then along the one or more rails 20 to the aft end of the aircraft, where the first cargo load is secured for transport. This may be followed by a second cargo load 38, a third cargo load 40 and so on until the cargo deck 12 is filled to a desired capacity with cargo. After the aircraft 10 has reached its destination, each cargo load, such as, for example, the first cargo load 36, the second cargo load 38 and the third cargo load 40 are unloaded from the aircraft 10 in similar fashion, but in a reverse sequence to the loading procedure. To facilitate movement of the cargo loads along the cargo deck 12, the aircraft 10 may include a cargo handling system as described herein and in accordance with various embodiments.

Figure 2:
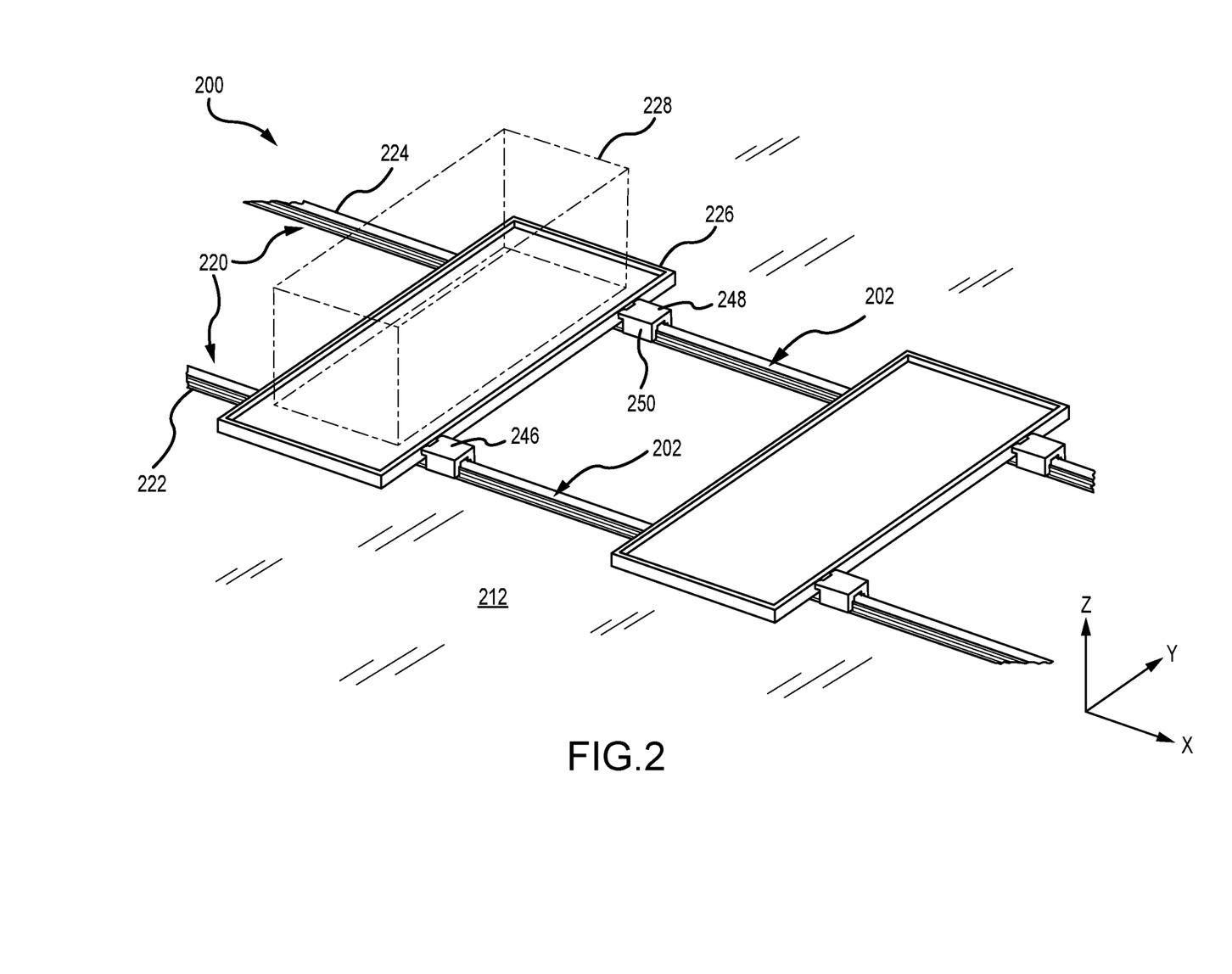
FIG. 2 illustrates a schematic view of a portion of a cargo handling system, in accordance with various embodiments.

Referring now to FIG. 2, a portion of a cargo handling system 200 is illustrated, in accordance with various embodiments. The cargo handling system 200 is illustrated with reference to an XYZ coordinate system, with the X-direction extending longitudinally in an aft direction (and defining a longitudinal direction), the Y-direction extending perpendicular to the X-direction (and defining a lateral direction) and the Z-direction extending vertically, each direction being with respect to an aircraft in which the cargo handling system 200 is positioned, such as, for example, the aircraft 10 described above with reference to FIGS. 1A and 1B. In various embodiments, the conveyance surface 202 may be defined by a plane that lies on the upper surface of the first rail 222 and the second rail 224. In various embodiments, the cargo handling system 200 may define a conveyance surface 202 having one or more rails 220, such as, for example, a first rail 222 and a second rail 224 spaced a lateral distance from the first rail 222, supported by a cargo deck 212, such as, for example, the cargo deck 12 described above with reference to FIGS. 1A and 1B. In various embodiments, the cargo handling system 200 includes a platform 226 (or a plurality of platforms), such as, for example, the platform 26 described above with reference to FIGS. 1A and 1B. The platform 226 is configured for rolling engagement with the first rail 222 and the second rail 224 via rollers or wheels or the like disposed between the platform 226 and the rails. Further, the platform 226 is configured to support a cargo load 228, which may include containerized or non-containerized cargo. As illustrated in FIG. 1B, in various embodiments, the conveyance surface 202 may include a substantially level surface throughout the length of the aircraft, though a portion of the conveyance surface 202 may be curved upward, particularly toward the aft end of the aircraft where the fuselage tends to curve upward at its base in order to facilitate takeoff and landing. As described in more detail below, the platform 226 is configured to be pushed or pulled along the conveyance surface 202 via a tug 250 or a tug assembly (or a plurality of tugs or tug assemblies). For example, in various embodiments, a first tug 246 may be engaged with the platform 226 and with the first rail 222 to propel the platform 226 along the first rail 222 and the second rail 224 in the longitudinal direction. Similarly, a second tug 248 may be engaged with the platform 226 and with the second rail 224 to propel the platform 226 along the first rail 222 and the second rail 224 in the longitudinal direction.

Referring now to FIGS. 3A, 3B, 3C and 3D, a tug 350, such as, for example, the tug 250 described above with reference to FIG. 2, is illustrated. The tug 350 includes a housing 352 configured to house a power drive unit 354 and a guide unit 356. In various embodiments, the power drive unit 354 includes a drive wheel 358 (or a plurality of drive wheels). The drive wheel 358 (or a first drive wheel) is configured to ride on or above an upper surface 360 (or an upward facing surface) of one or more rails 320, such as, for example, a rail 321, similar to the one or more rails 220, or the first rail 222 or the second rail 224, described above with reference to FIG. 2. In various embodiments, the power drive unit 354 includes a motor 362 that is connected to the drive wheel 358 and configured to rotate the drive wheel 358 for motive purposes—e.g., to propel the tug 350 in a forward or an aft direction along a length of the rail 321 (or in a longitudinal direction with respect to the rail). In various embodiments, the power drive unit 354 includes additional wheels, such as, for example, a second wheel 359 (spaced a lateral distance from the first wheel), a third wheel 364 (spaced a longitudinal distance from the first wheel) and a fourth wheel 365, each of which may be connected to the motor 362 for motive purposes or configured to freewheel and provide support for the tug 350 as it moves across the rail 321. As such, each of the second wheel 359, the third wheel 364 and the fourth wheel 365 may be considered a drive wheel (e.g., a second drive wheel, a third drive wheel or a fourth drive wheel, respectively) or a freewheel. Still referring to FIGS. 3A-3D, in various embodiments, the guide unit 356 includes a guide wheel 366 (or a plurality of guide wheels). The guide wheel 366 (or a first guide wheel) is configured to ride under or below a lower surface 368 (or a downward facing surface) of the one or more rails 320, e.g., the rail 321. In various embodiments, the guide unit 356 includes additional wheels, such as, for example, a second guide wheel 367, a third guide wheel 370 and a fourth guide wheel 371, each of which may be configured to ride under or adjacent to the lower surface 368 of the rail 321.

Figure 3A:
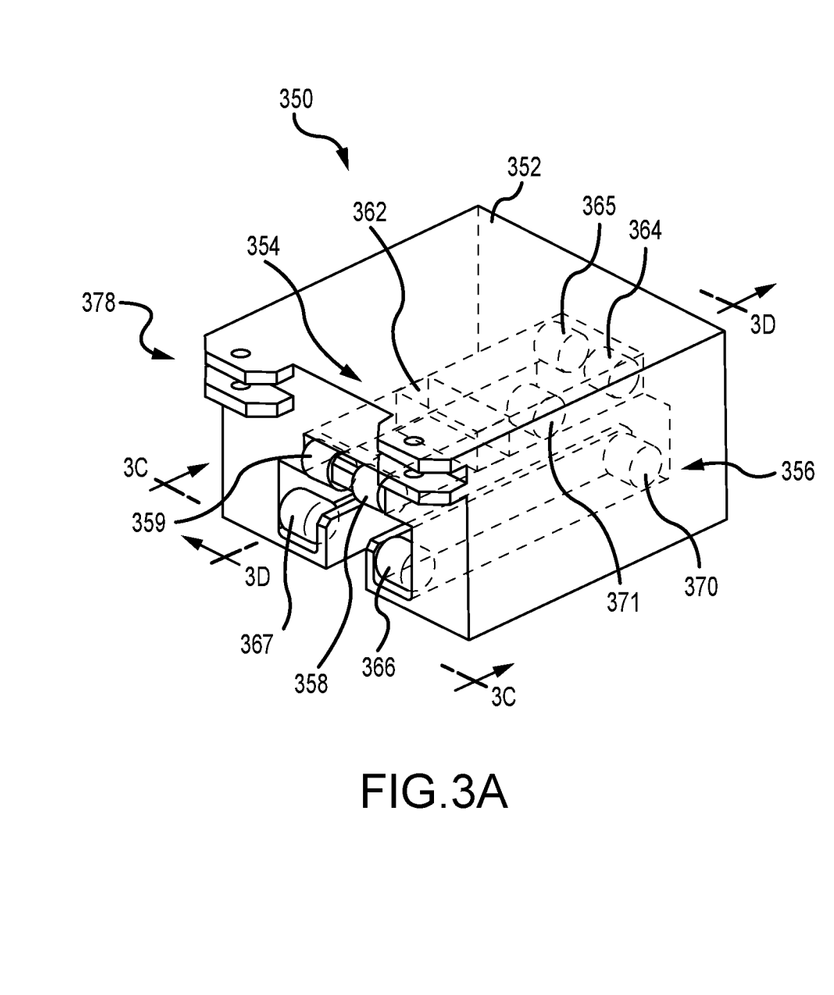
FIGS. 3A, 3B, 3C and 3D illustrate schematic views of a tug assembly for a cargo handling system, in accordance with various embodiments.
Figure 3B:
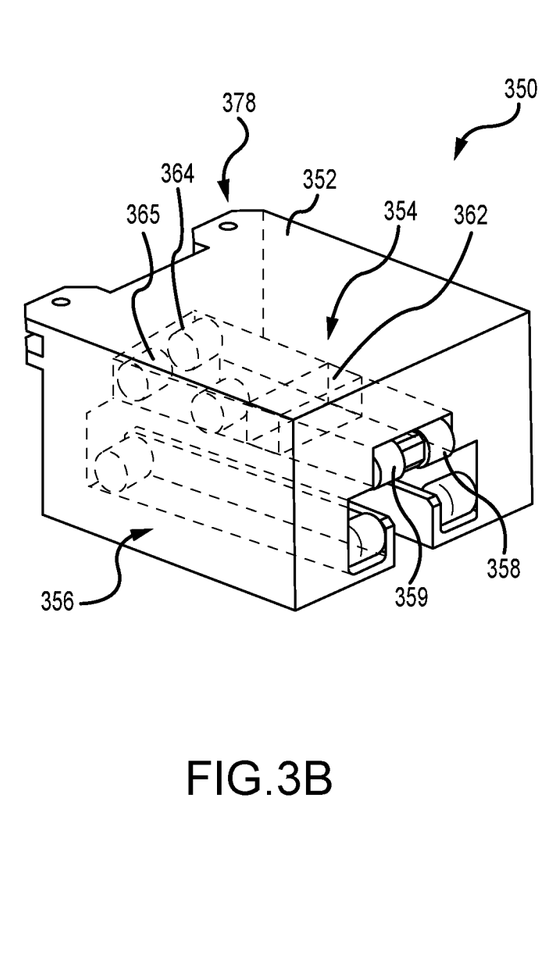
Figure 3C:
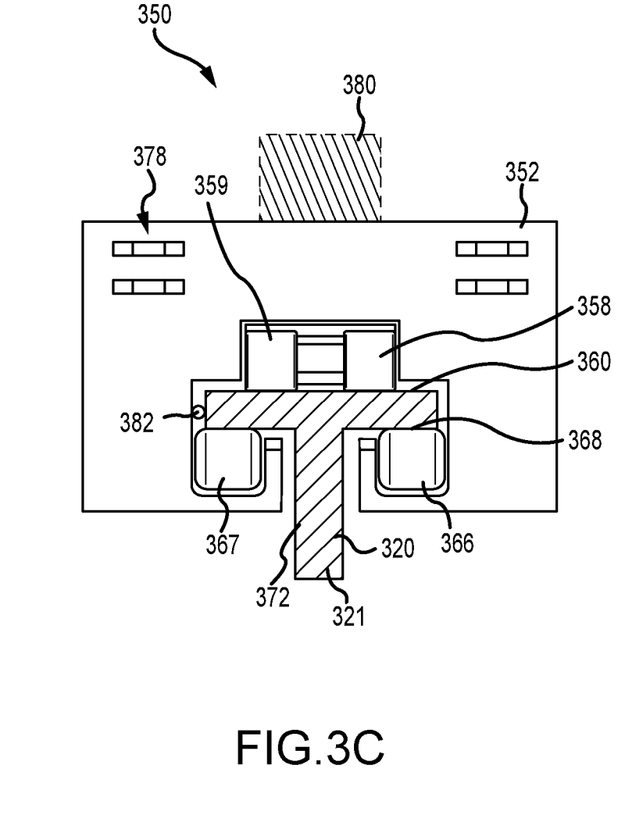
Figure 3D:
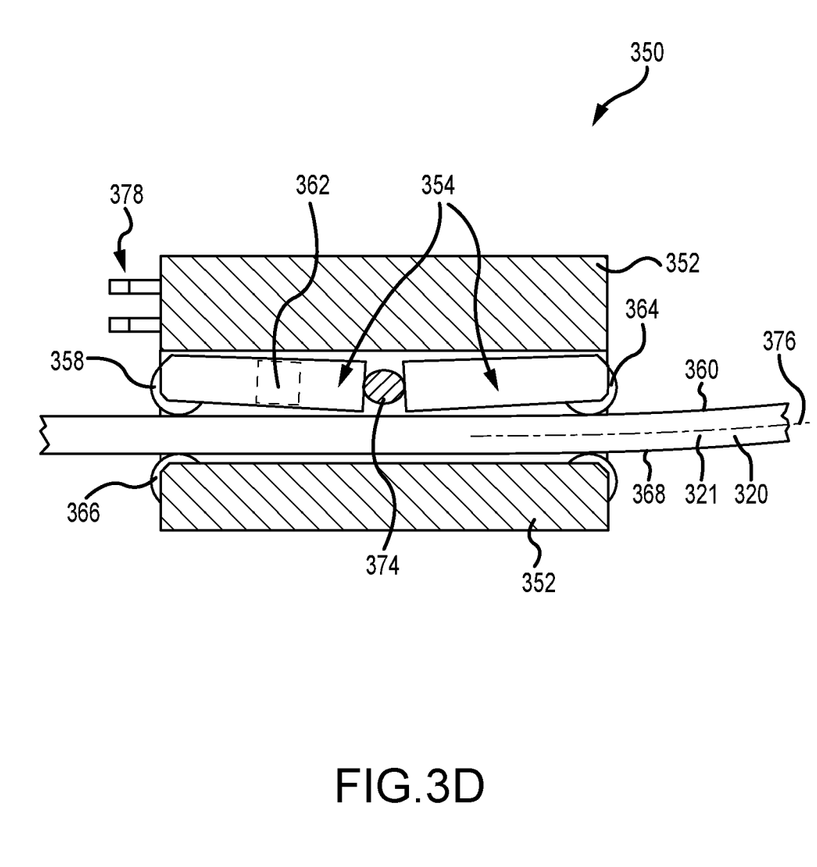

Referring more specifically to FIGS. 3C and 3D, each of the one or more rails 320, in various embodiments, defines a T-shaped cross-sectional geometry. The T-shaped geometry permits the drive wheels—e.g., one or more of the first drive wheel, the second drive wheel, the third drive wheel and the fourth driver wheel—to rest upon and frictionally engage with the upper surface 360 of the rail 321 as the tug 350 propels itself and a platform, such as, for example, the platform 226 described above with reference to FIG. 2, along the rail 321. At the same time, the geometry permits a first pair of the guide wheels (e.g., the first guide wheel and the third guide wheel 370) to ride under or freewheel against a first side of the rail 321 and a second pair of the guide wheels (e.g., the second guide wheel 367 and the third guide wheel 370) to ride under or freewheel against a second side of the rail 321. A central beam portion 372 of the rail 321, in combination with the first pair of guide wheels and the second pair of guide wheels, prevents the tug 350 from running off the upper surface 360 of the rail 321. Further, in various embodiments, the power drive unit 354 may include a flex mechanism 374, such as, for example, a hinge of a flexing portion within a frame of the power drive unit 354. The flex mechanism 374 enables the power drive unit 354 to flex when traversing areas where the rail 321 may exhibit curvature along its length (as opposed to being straight). For example, as illustrated in FIG. 3D, the rail 321 exhibits a degree of upward curvature 376 along an axial length of the rail 321. The curvature enables, in various embodiments, a cargo handling system to extend aft toward the tail of the aircraft where the fuselage tends to curve upward at its base in order to facilitate takeoff and landing, as illustrated in FIG. 1B. In addition, as illustrated in each of FIGS. 3A-3D, the housing 352 may include a connector 378 (or a plurality of connectors) in order to connect and disconnect the tug 350 to a platform, such as, for example, the platform 226 described above with reference to FIG. 2.

Still referring to FIGS. 3A-3E, the tug 350 is typically powered by a source of electrical power which, in various embodiments, may comprise a storage device 380 (e.g., a direct current battery) positioned on top of or within the tug 350 or on top of or within the platform to which the tug 350 is connected. The storage device 380 may then be electrically coupled to the motor 362 via a cable or other suitable conductor for electrical power. In various embodiments, the rail 321 may be electrified to provide power to the tug 350. In such embodiments, the tug 350 may include a contact 382 positioned on the housing 352 and configured to ride against and make contact with the rail 321. A suitable ground contact may be located elsewhere (e.g., adjacent a ground rail or a ground portion of the rail 321 that is electrically shielded from the rest of the rail 321) and configured to complete an electrical circuit to the motor 362.

Figure 4:
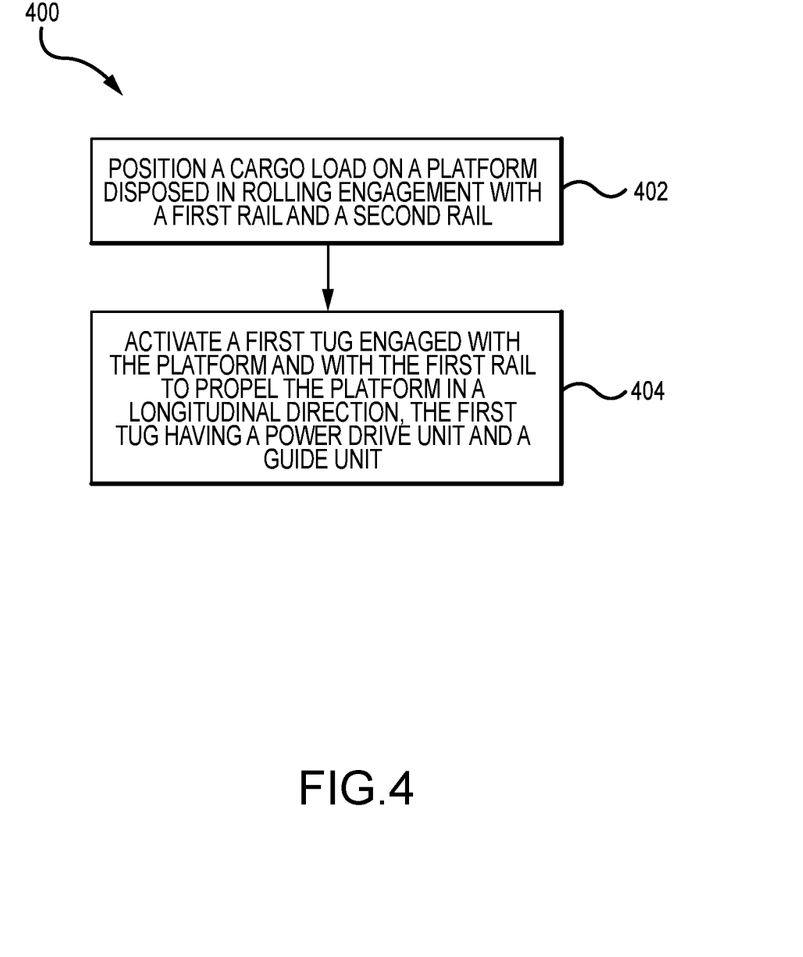
FIG. 4 describes a method of loading or unloading cargo with a cargo handling system, in accordance with various embodiments.

Referring now to FIG. 4, a method 400 for loading cargo using a cargo handling system is described. In a first step 402, a cargo load is positioned on a platform disposed in rolling engagement with a first rail and a second rail. In a second step 404, a first tug engaged with the platform and with the first rail is activated to propel the platform along the first rail and the second rail in a longitudinal direction, where the first tug comprises a first power drive unit having a drive wheel and a first guide unit having a guide wheel. In various embodiments, the method comprises activating a second tug engaged with the platform and the second rail to propel the platform along the first rail and the second rail in the longitudinal direction. In various embodiments, the first rail defines a T-shaped cross-sectional geometry and the drive wheel is configured to rest upon and frictionally engage an upward facing surface of the first rail. In various embodiments, the guide wheel is configured to freewheel against a downward facing surface of the first rail.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
    a first rail defining an upward facing surface and a downward facing surface and a longitudinal direction and a lateral direction;
    a platform configured for rolling engagement with the first rail; and
    a first tug configured to propel the platform along the first rail in the longitudinal direction, the first tug comprising a power drive unit having a first drive wheel and a guide unit having a first guide wheel,
        wherein the first rail defines a T-shaped cross-sectional geometry and the first drive wheel is configured to rest upon and frictionally engage the upward facing surface of the first rail and
        wherein the first tug includes a housing within which the first drive wheel is rotatably disposed and configured to ride above the upward facing surface of the first rail and within which the first guide wheel is rotatably disposed and configured to ride below the downward facing surface of the first rail.

2. The cargo handling system of claim 1, wherein the power drive unit includes a second drive wheel spaced a longitudinal distance from the first drive wheel.

3. The cargo handling system of claim 1, wherein the power drive unit includes a second drive wheel spaced a lateral distance from the first drive wheel.

4. The cargo handling system of claim 1, wherein the guide unit includes a second guide wheel spaced a longitudinal distance from the first guide wheel.

5. The cargo handling system of claim 1, wherein the guide unit includes a second guide wheel spaced a lateral distance from the first guide wheel.

6. The cargo handling system of claim 1, wherein the power drive unit includes a motor configured to rotate the first drive wheel.

7. The cargo handling system of claim 6, wherein the motor is configured to receive power from a storage device positioned on or within the platform.

8. The cargo handling system of claim 6, wherein the motor is configured to receive power from the first rail.

9. The cargo handling system of claim 1, wherein a second rail is spaced a lateral distance from the first rail and the platform is configured for rolling engagement with the second rail.

10. The cargo handling system of claim 9, wherein a second tug is configured to propel the platform along the second rail in the longitudinal direction.

11. A method for loading cargo using a cargo handling system, comprising:
    positioning a cargo load on a platform disposed in rolling engagement with a first rail and a second rail;
    activating a first tug engaged with the platform and with the first rail to propel the platform along the first rail and the second rail in a longitudinal direction, the first tug comprising a power drive unit having a drive wheel and a guide unit having a guide wheel; and
    activating a second tug engaged with the platform and the second rail to propel the platform along the first rail and the second rail in the longitudinal direction,
        wherein the first rail defines a T-shaped cross-sectional geometry and the drive wheel is configured to rest upon and frictionally engage an upward facing surface of the first rail and
        wherein the first tug includes a housing within which the drive wheel is rotatably disposed and configured to ride above the upward facing surface of the first rail and within which the guide wheel is rotatably disposed and configured to ride below a downward facing surface of the first rail.

12. The method of claim 11, wherein the guide wheel is configured to freewheel against the downward facing surface of the first rail.

13. A system for loading or unloading cargo on a cargo deck, comprising:
a first rail and a second rail, each defining an upward facing surface and a downward facing surface and a longitudinal direction and a lateral direction;
a platform configured for rolling engagement with the first rail and the second rail;
a first tug engaged with the platform and with the first rail and configured to propel the platform in the longitudinal direction, the first tug comprising a power drive unit having a first drive wheel and a guide unit having a first guide wheel; and
a second tug engaged with the platform and with the second rail and configured to propel the platform in the longitudinal direction,
wherein the first rail defines a T-shaped cross-sectional geometry and the first drive wheel is configured to rest upon and frictionally engage the upward facing surface of the first rail and
wherein the first tug includes a housing within which the first drive wheel is rotatably disposed and configured to ride above the upward facing surface of the first rail and within which the first guide wheel is rotatably disposed and configured to ride below the downward facing surface of the first rail.

14. The system of claim 13, wherein the power drive unit includes a second drive wheel spaced from the first drive wheel in the lateral direction and the guide unit includes a second guide wheel spaced from the first guide wheel in the lateral direction.

15. The system of claim 13, wherein the power drive unit includes a motor configured to rotate the first drive wheel and to receive power from a storage device positioned on or within the platform or from the first rail.

* * * * *